# United States Patent Office 3,047,113
Patented July 31, 1962

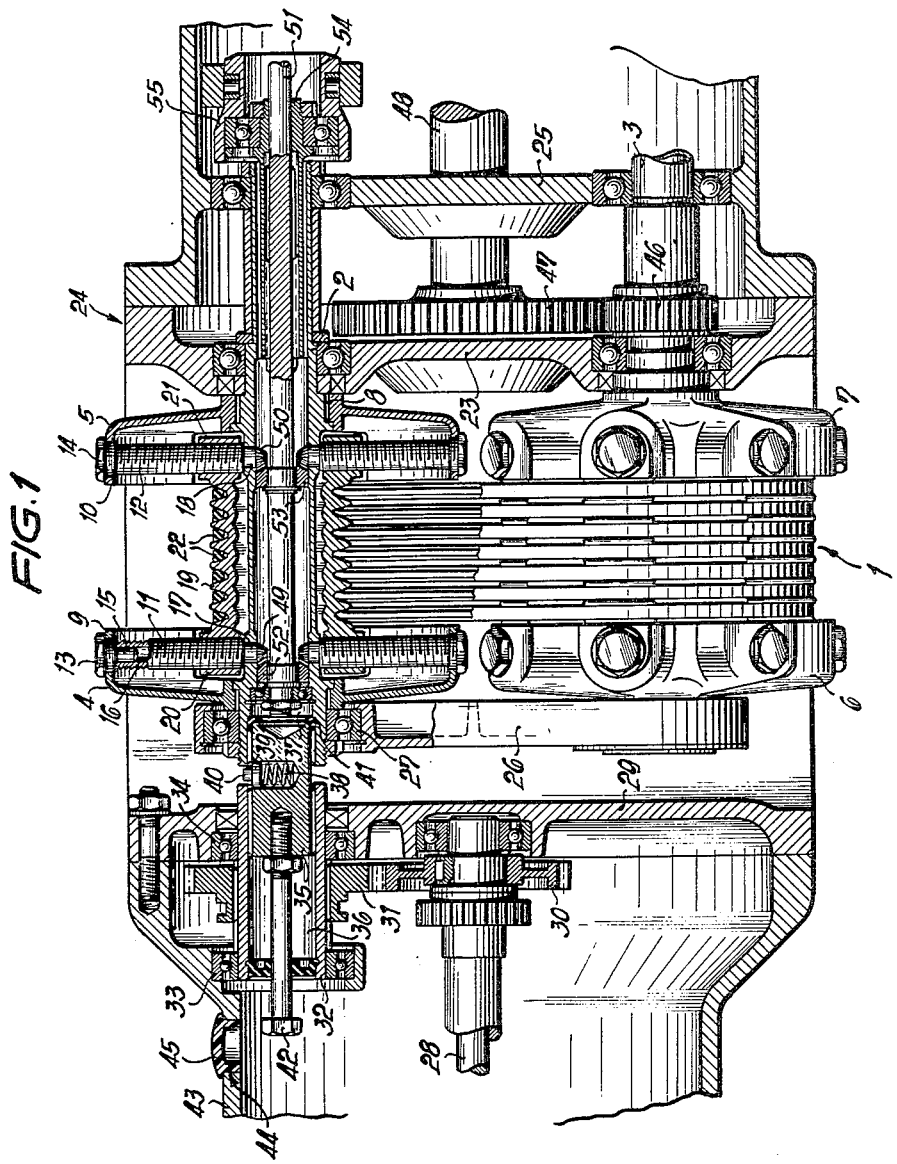

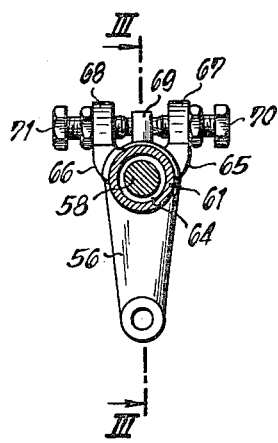
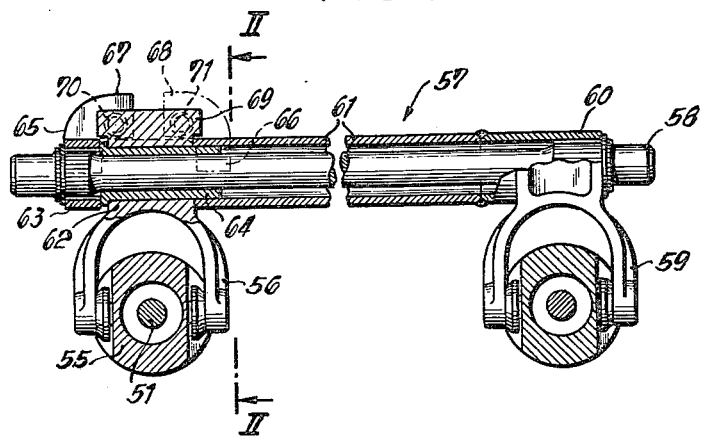

3,047,113
V-BELT TRANSMISSION
Hans Hoenick, Stuttgart-Zuffenhausen, Germany, assignor to Firma Dr. Ing. h.c. F. Porsche KG, Stuttgart-Zuffenhausen, Germany
Filed May 10, 1960, Ser. No. 28,084
Claims priority, application Germany May 27, 1959
8 Claims. (Cl. 192—3.5)

The present invention relates to a continuously variable, adjustable V-belt transmission, especially for the drive of vehicles, the driving and driven shafts of which are supported in walls of a housing surrounding the transmission.

With the known prior art V-belt transmissions, difficulties arise in connection with the exchange of the belts which is feasible only after removal of several structural parts. It has already been proposed in the prior art to arrange one of the shafts of the transmission in a self-supporting, cantilever-like manner and to support the other shaft by means of outrigger supporting arms. These arms, however, have to extend between the shafts of the transmission so that a correspondingly large distance is necessary therebetween. In the use of such pior art arrangement and construction, the transmission housing becomes quite large and has a corresponding large weight. For these reasons, the installation of such transmissions in vehicles has not been practically feasible heretobefore.

The purpose and aim which underlies the present invention, essentially consists in creating a continuously variable, i.e., steplessly adjustable V-belt transmission for the installation thereof into vehicles which transmission is characterized by a simple construction, relatively small dimensions and easy interchangeability of the belts thereof.

The foregoing aims are achieved, in accordance with the present invention, by arranging the shafts of the V-belt transmission in an overhung manner in a common support wall of the transmission housing. By the use of such an arrangement, the distance between the two shafts of the transmission may also be reduced to a minimum, since brackets and support arms are not required and may, therefore, be dispensed with altogether. Such an arrangement offers the advantage, especially with a transmission having a plurality of V-belts, that the adjusting mechanism for the pulleys may be arranged on one side of the transmission, whereby a more simple and more compact construction is rendered possible. Additionally, an exchange of the V-belts is possible in the arrangement according to the present invention without prior removal of structural parts. The support of the shafts of the V-belt transmission takes place in an advantageous manner in supporting walls arranged adjacent each other and at a distance from one another, whereby a gear drive may also be accommodated within the chamber formed by the supporting walls. The shafts of the belt transmission, which extend through this chamber, thereby serve for purposes of supporting the gears of the gear drive.

In order to remove the load from the driving and driven shafts of the V-belt transmission as well from the bearings thereof, it is further proposed in accordance with the present invention to support the free ends of the shafts of the V-belt transmission by means of a supporting member or strut extending therebetween.

With a transmission in which the input and output of the V-belt transmission takes place on opposite sides of the transmission, it is further proposed, in accordance with the present invention, that the driving shaft of the V-belt transmission be operatively connected with the drive shaft or crankshaft of the internal combustion engine by means of a disengageable clutch. The use of such an arrangement also offers the possibility with such a transmission to provide a V-belt transmission according to the present invention for a simple interchange of the belts. The clutch is preferably formed by a splined shaft portion which engages in correspondingly constructed ends of the driving shaft of the transmission and of the input shaft thereof constituted, for example, by the crankshaft. The splined shaft portion is further retained during the form-locking connection thereof with the driving shaft of the transmission by means of a stop mechanism. Any unintentional disengagement of the driving connection during the drive is thereby effectively avoided. A spring acts axially on the splined shaft portion in the driving position thereof, whereby the spring consists in an advantageous manner of an insert made of elastic material, such as rubber or the like.

Accordingly, it is an object of the present invention to provide a V-belt transmission for vehicles which obviates the deficiencies and shortcomings of the prior art so as to permit ready use thereof in vehicles, especially for the drive of motor vehicles such as tractors.

Another object of the present invention is the provision of a V-belt transmission which is simple in construction, of relatively light-weight, and which permits a particularly easy and simple interchange of the drive belts.

A still further object of the present invention is the provision of a V-belt transmission, for motor vehicles, in which both the driving and driven shafts of the transmission are supported in such a manner as to render feasible an easy installation thereof without subjecting the same or the bearing supports thereof to excessive loads.

Still another object of the present invention is the provision of a support arrangement for the shafts of a V-belt transmission in which the shafts are relieved of excess stresses and loads.

These and other objects, features and advantages of the present invention will become more obvious from the following description, when taken in connection with the accompanying drawing, which shows, for purposes of illustration only, one embodiment in accordance with the present invention and wherein FIGURE 1 is a horizontal cross-sectional view through a V-belt transmission in accordance with the present invention, FIGURE 2 is a cross-sectional view taken along line II—II of FIGURE 3 and illustrating in detail the adjusting mechanism for the V-belt transmission in accordance with the present invention, and FIGURE 3 is a cross-sectional view taken along line III—III of FIGURE 2 and illustrating the adjusting mechanism for the V-belt transmission in accordance with the present invention.

Referring now to the drawing, wherein like reference numerals are used throughout the various views to designate corresponding parts, and more particularly to FIGURE 1, a V-belt transmission generally designated by reference numeral 1 is provided as the drive transmission for a vehicle, such as a tractor. In general, the V-belt transmission 1 is essentially composed of a drive shaft 2, and of a driven shaft 3, which each support thereon two disks 4 and 5 and two disks 6 and 7, respectively, arranged at a distance from one another. The disks 4, 5 and 6, 7 are press-fitted on shafts 2 and 3, respectively, and are additionally secured against relative rotation with respect thereto by means of a keyway or splined connection 8. Since both shaft arrangements 2 and 3 are essentially identical, only shaft 2 and the structural parts arranged thereat of the V-belt transmission 1 will be described hereinafter in detail, it being understood that shaft 3 is constructed and provided with similar elements.

The free ends 9 and 10 of the disks 4 and 5 of the input shaft 2 are angularly bent and serve for the support of a plurality of spindles 11 and 12, respectively, which extend radially and are distributed annularly. A corresponding number of bolts 13 and 14 are anchored thereby in any suitable manner in the ends 9 and 10 of the disks 4 and 5, and engage with the pin portions 15 thereof in bores 16 of spindles 11 and 12, respectively. Additionally, the spindles 11 and 12 are supported with the pin portions 17 and 18 formed integrally therewith within shaft 2.

Belt-pulley sectors 19 disposed between disks 4 and 5 and subtending each a suitable angle extend each between oppositely disposed spindles, for example, between the spindles 11 and 12, which belt-pulley sectors 19 are each provided at the ends thereof with bores 20 and 21 through which the spindles 11 and 12 extend. Each of the bores 20 and 21 as well as the spindles 11 and 12 are provided with complementary threaded portions, preferably with a trapezoidal steep thread or large pitch thread, so that by rotation of the spindles 11 and 12, a radial movement to the sectors 19 in relation to the drive shaft 2 is obtained. The sectors 19 are further provided each with a plurality of V-belt shaped grooves for receiving the V-belts 22 by means of which the connection between the drive shaft 2 and the driven shaft 3 of the V-belt transmission is established.

Both shafts 2 and 3 of the V-belt transmission 1 are supported or journalled in a support wall 23 of the transmission housing generally designated by reference numeral 24. A further support of shafts 2 and 3 takes place in an additional wall 25 of housing 24 which extends at a distance from the support wall 23, whereby a high degree of stability of the shafts 2 and 3 is obtained. Furthermore, by reason of the particular arrangement of the supports for shafts 2 and 3, the individual bearings thereof may be dimensioned smaller and the thickness or strength of the walls may be chosen correspondingly smaller. Additionally, the distribution of the loads originating in the transmission in the housing 24 is thereby greatly improved.

The free ends of the shafts 2 and 3 are advantageously supported or braced by means of support member or support strut 26. The member 26 extends exclusively between the two shafts 2 and 3 and prevents any bending loads therein. This is of particular advantage in connection with V-belt transmissions which transmit relatively large torques, as is required in the drive of vehicles, and which, for that reason, are provided with a plurality of V-belts. The length of overhang of the shafts 2 and 3 is thereby so large that a corresponding dimensioning of the shafts would become necessary otherwise. In order to reduce the dimensions of shafts 2 and 3, the support member 26 is provided which is supported on the drive shaft 2 by means of a ball bearing 27. Of course, the support of the support member 26 at the driven shaft is realized in a corresponding manner by means of a similar ball bearing.

For this purpose, a gear 30 is arranged in a non-rotational and non-displaceable manner on a shaft 28 constituting the transmission input shaft which is supported in a cross wall 29 of the housing 24 and itself is operatively connected with the clutch (not shown). The gear 30 is in meshing engagement with another gear 31. The gear 31 is arranged so as to be non-rotatable with respect to a hollow shaft 32 which itself is supported in two bearings 33 and 34 arranged at a distance from each other. Preferably, the gear 31 is constructed so as to be slidable in the axial direction thereof in order to possibly obtain also a reversal of the direction of rotation of a hollow shaft 32.

The operative connection between the hollow shaft 32 and the drive shaft 2 of the V-belt transmission is realized by means of a disengageable clutch. This disengageable clutch consists essentially of a splined shaft portion 35 which is slidingly accommodated within a correspondingly constructed bore 36 of the hollow shaft 32 and engages in a bore 37 provided also with a splined corresponding configuration of the free end of the drive shaft 2 of the V-belt transmission.

The splined shaft portion 35 is shown in FIGURE 1 of the drawing in the operative or driving position thereof in which it operatively connects the two aforementioned shafts 32 and 2. The splined shaft portion 35 is thereby retained in this operative position by means of a stop or detent mechanism. The stop or detent mechanism essentially consists of a piston 39 spring-loaded by means of spring 38 which slides within a bore of the splined shaft portion 35. The piston 39 is provided with a pin 40 which extends into the gap limited by the ends of the shafts 32 and 2. The splined shaft portion 35 thereby abuts against an elastic annular member 41 consisting of rubber or an equivalent material and arranged within the bore 37 of the drive shaft 2 of the V-belt transmission by means of which the splined shaft portion 35 is spring-loaded in the axial direction thereof. A rattling or chattering of the splined shaft portion 35 is thereby effectively avoided.

A further bolt member 42 is arranged at the splined shaft portion 35 which is of such length that it extends outside of the splined shaft portion 35. Simultaneously, an aperture 44 is provided in the wall part 43 of the housing 24 disposed closest to the bolt 42 which is closed off by means of a readily removable closure plug 45.

A gear 46 is arranged at the driven shaft 3 within the area between the transmission walls 23 and 25 which effectively form a chamber. The gear 46 is in meshing engagement with a gear 47. The gear 47 is secured to a drive shaft 48 supported in the walls 23 and 25 of housing 24 which drive shaft 48 constitutes the transmission output shaft and drives, in a manner known per se, the differential (not shown) of the tractor.

The adjustment of the transmission ratio of the V-belt transmission 1 takes place by a simultaneously oppositely directed, radial adjustment or displacement of the sectors 19 mounted over shafts 2 and 3 which is obtained by a rotation of the spindles 11 and 12. The adjusting mechanism necessary therefor is accommodated within the driving and driven shafts 2 and 3, constructed as hollow shafts. Since the basic construction of this adjusting arrangement is essentially identical in both shafts 2 and 3, it will be only described hereinafter with reference to the drive shaft 2.

The pin portions 17 and 18 of spindles 11 and 12 are provided with bevel gears 49 and 50 which extend into the hollow shaft 2. A further shaft 51 is supported within the hollow shaft 2 which shaft 51 is provided within the region of the bevel gears 49 and 50 with annular gears 52 and 53 having each such an external tooth configuration as to mesh with the bevel gears 49 and 50. A sliding sleeve 54 is arranged at shaft 51 outside of the area of the V-belt transmission 1, which sliding sleeve 54 is operatively connected with the shaft 51 by means of a large pitch or a steep thread and with the drive shaft 2 by means of a splined connection. A sliding bearing 55 is arranged at the end of the sliding sleeve 54 extending out of the drive shaft 2, which sliding bearing 55 is operatively connected for common rotation with an actuating shaft assembly generally designated by reference numeral 57 (FIGURE 3) by means of shifting fork 56.

The adjusting mechanism for the V-belt pulleys of the drive shaft 2 and of the driven shaft 3 has only one differing feature, namely, the steep threads operatively connecting the sliding sleeves 54 with respective shafts 51 are provided with opposite threads. If, for example, the thread of sleeve 54 of the adjusting mechanism for the drive shaft 2 is a right-handed thread, then a left-handed thread is provided in the adjusting mechanism for the driven shaft 3.

The actuating shaft assembly 57 is constructed as hollow shaft and supported on a supporting shaft 58 (FIGURE 2) which, in turn, is suitably supported by appropriate bearings within the housing 24. The adjusting shaft assembly 57 is constructed of several parts and is composed essentially of a part 60 supporting thereon the shifting fork 59 of the adjusting mechanism for the driven shafts, of a tubular spacer member 61, of a part 62 supporting the shifting fork 56 and of a sleeve 63. The part 60 together with the shifting fork 59 is constructed as a single cast part and securely connected with the support shaft 58 for common rotation therewith, for example, by means of a splined or keyway connection. The tubular spacer member 61 is connected with the part 60, for example, by means of welding so that part 60 and part 61 form a rigid unit. The sleeve 63 is also connected with the support shaft 58 for common rotation therewith. The part 62 is accommodated between the sleeve 63 and the spacer member 61 which part 62 is freely rotatably supported on the support shaft 58 by means of a bearing bushing 64.

The part 62 is operatively connected, by means of a detachable securing means, with the sleeve 63 and with the spacer member 61. This securing means consists of two brackets 65 and 66 arranged on opposite longitudinal end sides of the sleeve 63 and of the spacer member 61, which brackets 65 and 66 are provided within the region of the adjusting shaft part 62 with projections 67 and 68. Additionally, the part 62 of the adjusting shaft assembly 57 is provided with an abutment member 69 which is disposed between the projections 67 and 68 and retained by means of bolts 70 and 71 secured in the projections 67 and 68.

If the actuating shaft 57 is rotated either manually or by means of a suitable mechanism, for example, one including a suitable power assist, then the sliding sleeve 54 is axially displaced by the shifting fork 56 and by the sliding bearing 55. The axial movement of the sleeve 54 is transformed into a rotary movement of the shaft 51 by means of the threaded connection which operatively connects the sliding sleeve 54 with the shaft 51. This rotary movement is thereupon transmitted through the pairs of meshing bevel gears 52, 49 and 53, 50 to the threaded spindles 11 and 12 which thereby effect upon rotation thereof a radial adjustment of the belt-pulley sectors 19.

If one or several V-belts of the transmission are to be removed, then the V-belt transmission has to be adjusted in such a manner that the sectors 19 of the drive shaft 2 assume the positions thereof corresponding to the smallest radius, as illustrated in the drawing. Thereupon, the connection of the shifting fork 56 with the adjusting shaft assembly 57 is interrupted by loosening bolts 70 and 71 and the adjusting shaft 57 is thereafter actuated in the opposite direction. As a result thereof, the V-belt pulley sectors 19 of the driven shaft 3 are also brought to the smallest diametric dimension thereof.

Subsequent thereto, the closure plug 45 is removed from the aperture 44 in the wall part 43 and the detent mechanism of the splined shaft portion 35 is disengaged by depressing the pin 40. The splined shaft portion 35 may thereupon be displaced toward the left, as viewed in FIGURE 1, by means of a tool inserted into the aperture 44 and engaging the bolt 42, whereby the connection of the drive shaft 2 of the V-belt transmission 1 with the hollow shaft 32 is interrupted. The individual V-belts are thereupon slipped off over the disks 4 and 6 and are removed from the transmission.

The installation of the V-belts takes place in the opposite sequence.

While I have shown and described one embodiment in accordance with the present invention, it is understood that the same is not limited thereto but is susceptible of many changes and modifications within the spirit and scope of the present invention. For example, different belt transmissions may be used to which the basic principles of the present invention are applicable.

Thus, it is quite obvious that the present invention is susceptible of numerous changes and modifications within the spirit and scope thereof and I, therefore, do not wish to be limited to the details shown and described herein but intend to cover all such changes and modifications as are encompassed by the scope of the appended claims.

I claim:

1. A continuously variable belt transmission, especially for the drive of vehicles, comprising a driving shaft, a driven shaft, a transmission housing surrounding the transmission and including common supporting wall means, adjustable belt transmission means operatively connecting said shafts and operative to selectively vary the transmission ratio therebetween, means supporting said shafts in overhung position within said common supporting wall means, and freely supported means mounted over the free ends of said shafts to relieve the same of bending stresses.

2. A continuously variable belt transmission according to claim 1, wherein said common supporting wall means includes two adjacent supporting walls spaced at a distance from one another and enclosing therebetween a chamber, at least some of said shaft means extending through said chamber, and gear drive means including a plurality of meshing gears mounted on the shaft means extending through said chamber.

3. A continuously variable belt transmission according to claim 2, further comprising input means, and disengageable clutch means operatively connecting said input means with said driving shaft including detent means for keeping said disengageable clutch means in the engaging position thereof.

4. A continuously variable belt transmission according to claim 3, further comprising means for disassembling said disengageable clutch means.

5. A continuously variable belt transmission according to claim 1, wherein said driving shaft is a hollow shaft, a hollow input shaft, and disengageable clutch means including a splined shaft portion engaging into correspondingly shaped ends of said input shaft and said driving shaft for operatively connecting said input shaft with said driving shaft, and detent means for retaining said disengageable clutch in the form-locking engaging position thereof.

6. A continuously variable belt transmission according to claim 5, further comprising means enabling the ready removal of said splined shaft portion out of said transmission.

7. A continuously variable belt transmission, especially for the drive of vehicles, comprising a driving shaft, a driven shaft, a transmission housing surrounding the transmission and including supporting wall means, adjustable belt transmission means operatively connecting said shafts and operative to selectively vary the transmission ratio therebetween, means supporting said shafts in overhung position within said supporting wall means, and freely supported means mounted over the free ends of said shafts to relieve the same of bending stresses.

8. A continuously variable belt transmission, especially for the drive of vehicles, comprising a driving shaft, a driven shaft, a transmission housing surrounding the transmission and including supporting wall means, adjustable belt transmission means operatively connecting said shafts and operative to selectively vary the transmission ratio therebetween, means supporting said shafts in overhung position within said supporting wall means, and freely supported means mounted over the free ends of said shafts to relieve the same of bending stresses, inputs means, and disengageable clutch means operatively connecting said input means with said driving shaft including detent means for keeping said disengageable clutch means in the engaging position thereof.

References Cited in the file of this patent

UNITED STATES PATENTS

| | | |
|---|---|---|
| 664,996 | Everett | Jan. 1, 1901 |
| 1,776,339 | Siqueland | Sept. 23, 1930 |
| 2,338,121 | Le Blond et al. | Jan. 4, 1944 |
| 2,420,100 | Salsbury | May 6, 1947 |